United States Patent
Tachigori

[19]

[11] Patent Number: 6,023,546
[45] Date of Patent: Feb. 8, 2000

[54] STRUCTURE FOR SECURING OPTICAL DEVICE AND FIBER OPTICS

[75] Inventor: Masashi Tachigori, Tokyo, Japan

[73] Assignee: NEC Corporation, Tokyo, Japan

[21] Appl. No.: 09/108,822

[22] Filed: Jul. 1, 1998

[30] Foreign Application Priority Data

Jul. 2, 1997 [JP] Japan .................................. 9-176257

[51] Int. Cl.⁷ .................................................. G02B 6/30
[52] U.S. Cl. ............................................................. 385/49
[58] Field of Search .............................. 385/2, 3, 8, 40, 385/131, 132, 49, 52, 59; 216/2, 41, 67, 79; 430/321, 326

[56] References Cited

U.S. PATENT DOCUMENTS

| | | | |
|---|---|---|---|
| 4,725,114 | 2/1988 | Murphy ...................................... | 385/59 |
| 5,359,687 | 10/1994 | McFarland et al. ...................... | 385/49 |
| 5,628,017 | 5/1997 | MacDonald et al. ..................... | 216/41 |
| 5,757,986 | 5/1998 | Crampton et al. ........................ | 385/40 |
| 5,774,614 | 6/1998 | Gilloland et al. . | |

FOREIGN PATENT DOCUMENTS

| | | |
|---|---|---|
| 0 550 973 A1 | 7/1993 | European Pat. Off. . |
| 0 600 645 A1 | 6/1994 | European Pat. Off. . |
| 0 636 911 A1 | 2/1995 | European Pat. Off. . |
| 3-158805 | 7/1991 | Japan . |
| 6-138341 | 5/1994 | Japan . |
| 8-201660 | 8/1996 | Japan . |

OTHER PUBLICATIONS

Patent Abstracts of Japan 06 138341 dated May 20, 1994.

*Primary Examiner*—Akm E. Ullah
*Attorney, Agent, or Firm*—Scully, Scott, Murphy & Presser

[57] ABSTRACT

The securing structure for optical device and fiber optics of the present invention comprises a substrate having a through hole through which a fiber optics is inserted, and an optical device secured on the plane of substrate at which the through hole opens. The substrate has a first position pattern provided in relation to the location of a through hole on the plane of substrate at which the through hole opens, while the optical device has a second position pattern provided in relation to the location of a light receiving or emitting section. The fiber optics inserted into the substrate can be coupled optically to the optical device from the positional relationship between the first and second position patterns.

According to the present invention, since the location of the through hole into which the fiber optics is inserted is identified by the first position pattern, and the location of the light receiving or emitting section of the optical device is identified by the second position pattern, it is possible to align the fiber optics and the light receiving or emitting section of the optical device by aligning the first and second position patterns.

7 Claims, 9 Drawing Sheets

FIBER OPTICS
INSERTED SIDE

Fig.7

LIGHT RECEIVING
DEVICE CONTACTING
SIDE

Fig.8

SUBSTRATE
CONTACTING SIDE

Fig.9

ELECTRODE SIDE

STRUCTURE FOR SECURING OPTICAL DEVICE AND FIBER OPTICS

BACKGROUND OF THE INVENTION

The present invention relates to a structure for securing an optical device and fiber optics, and, more particularly, to a structure for securing an optical device and fiber optics in a high accuracy.

An example of conventional structure for securing an optical device and fiber optics is described in Japanese Patent Application Laid-Open No. 8-201660 (hereinafter called the "first prior art"). According to the description, there is formed a V-groove in a substrate such as silicon, in which a termination of fiber optics is secured, while a light emitting device is secured on its optical axis, or Z-axis with relatively low accuracy.

Then, there is formed a V-groove on the Z-axis to cross it, in which a spherical lens is contained. The spherical lens is slid along the V-groove while operating the light emitting device to actually measure coupling with the fiber optics, thereby adjusting the light beam to an optimal state.

Another securing structure is described in Japanese Patent Application Laid-Open No. 3-158805 (second prior art). According to the description, fiber optics of which the end face is cut askew is mounted on the substrate formed with the V-groove, and the optical axis is refracted on that face to optically couple it to a surface incident light receiving device directly mounted on the plane of substrate.

Still another securing structure is described in Japanese Patent Application Laid-Open No. 6-138341 (third prior art). According to the description, a silicon guide plate is attached to a transparent substrate, and fiber optics is inserted into a guide hole.

However, the first prior art has a problem that the optical axis should be adjusted by operating the optical device to optically couple the optical device and the fiber optics. This is because the light emitting device is secured on the optical axis with a relatively low accuracy.

In addition, even if the optical device is secured with a high accuracy, it is necessary to position three optical axes of the fiber optics, the spherical lens, and the optical device with a high accuracy to obtain a high coupling efficiency. Therefore, a high optical coupling efficiency cannot be attained in the first prior art in which the spherical lens is mounted in the v-groove formed in the Z-axis to crossing it.

Furthermore, the first prior art also has a problem that a surface type optical device cannot be directly applied. It is because it is very difficult to place the surface of the optical device on a substrate such as silicon formed with the V-groove to cross the optical axis of the fiber optics (Z-axis). Therefore, in general, when a surface type optical device is mounted, it is necessary for the light receiving device 42 to be mounted on a carrier 41 as shown in a sectional view in FIG. 13, which shows a mounting structure of a prior art, so that the surface is caused to cross the optical axis (Z-axis). In this case, since the number of components is further increased, it becomes more difficult in practice to secure the optical axis without adjustment.

Then, since the second and third prior arts is to optically couple an optical device and fiber optics as in the first prior art, they have a problem that an optical axis should be adjusted while operating the optical device.

It is because the second prior art does not have a structure in which fiber optics and an optical device are uniquely positioned since it requires to control the direction of rotation or insertion position of the fiber optics to obtain a high optical coupling efficiency.

In addition, the third prior art is necessary to position a lens and an optical device with a high accuracy to obtain collimated light, so that no adjustment of the securing of optical axis is actually difficult.

SUMMARY OF THE INVENTION

An object of the present invention is to provide a structure for an optical device and fiber optics which eliminates the conventional problems and which enables it to secure the optical device and the fiber optics at a high accuracy without adjustment, whereby a high coupling efficiency can be obtained.

The securing structure for optical device and fiber optics of the present invention comprises a board having a through hole through which a fiber optics is inserted, and an optical device secured on the plane of board at which the through hole opens. The board have a first position pattern on the plane of board at which the through hole opens, while the optical device has a second position pattern provided in relation to the location of a light receiving or emitting section. The fiber optics inserted into the board can be coupled to the optical device from the positional relationship between the first and second position patterns.

According to the present invention, since the location of the through hole into which the fiber optics is inserted is identified by the first position pattern, and the location of the light receiving or emitting section of the optical device is identified by the second position pattern, it is possible to align the fiber optics and the light receiving or emitting section of the optical device by aligning the first and second position patterns.

BRIEF DESCRIPTION OF THE DRAWINGS

The above and other objects, features and advantages of the present invention will become apparent from the following detailed description when taken with the accompanying drawings.

DETAILED DESCRIPTION OF THE PREFERRED EMBODIMENTS

To make easy understanding of the present invention, the first through third prior arts mentioned above are first described.

Figure 1:
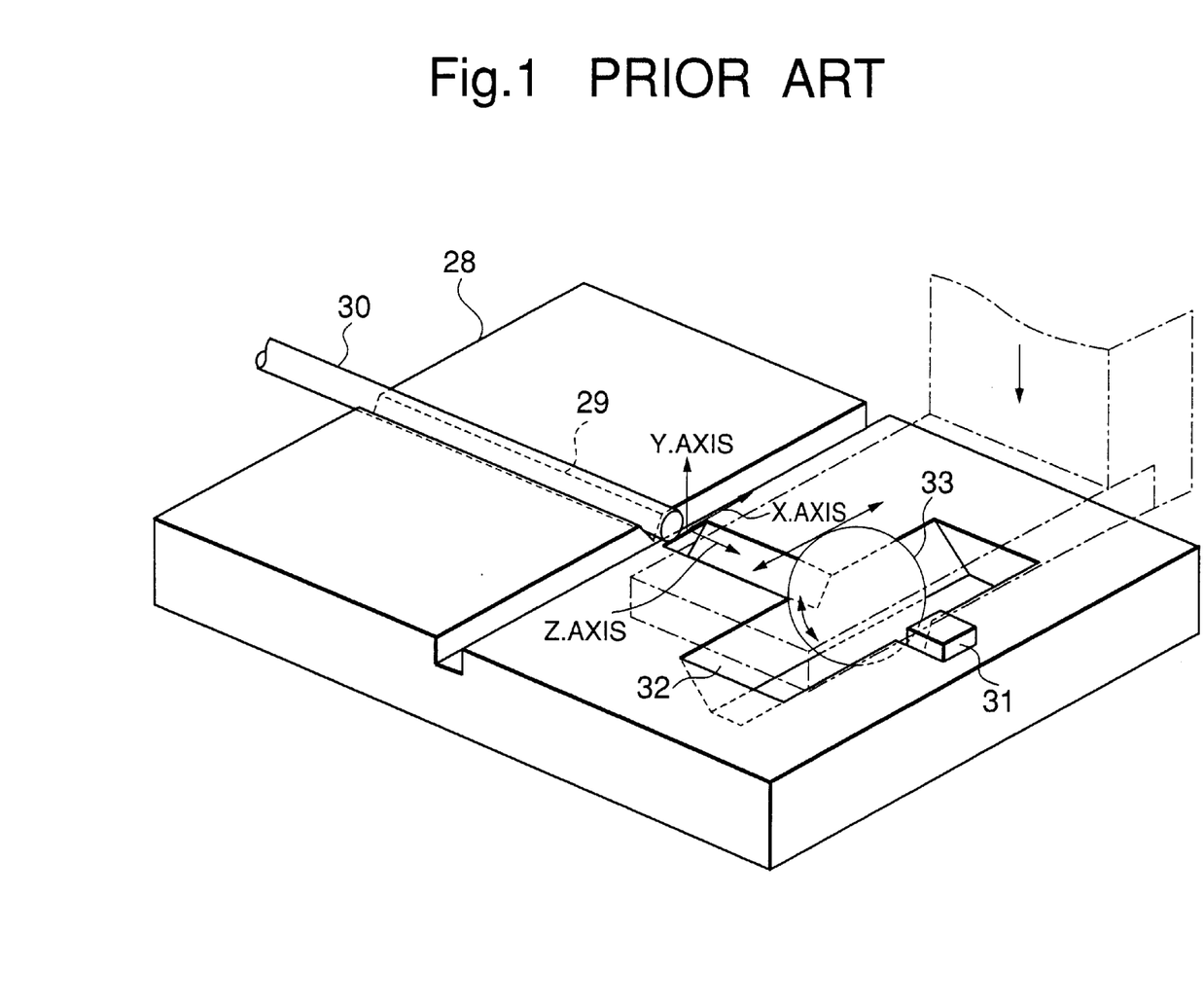
FIGS. 1–4 are a conventional securing structure of optical device and fiber optics.

FIG. 1 shows an external perspective view of the first prior art. A V-groove 29 is previously formed in the top surface of a substrate 28 such as silicon to secure a terminal of fiber optics 30, while a light emitting device 31 is secured on its optical axis or Z-axis with a relatively low accuracy.

Then, there is formed a V-groove 32 on the Z-axis to cross it, in which a spherical lens 33 is contained. The spherical lens 33 is slid along the V-groove 32 while operating the light emitting device 31 to actually measure coupling with the fiber optics 30, thereby adjusting the light beam to an optimal state.

Figure 2:
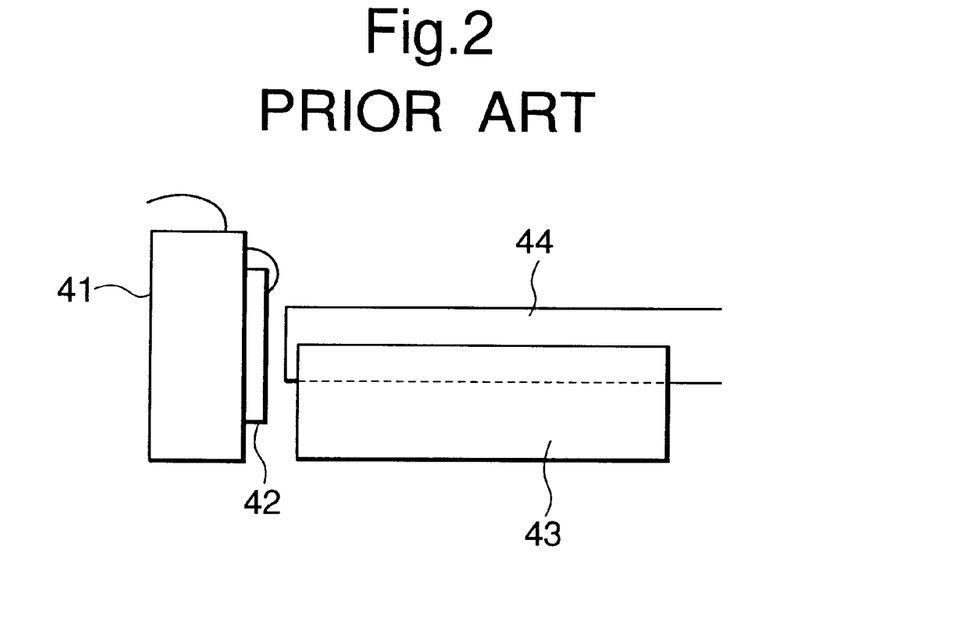

FIG. 2 shows a sectional view of the second prior art. In the figure, a fiber optics 35 of which the end face is cut askew is mounted on the substrate 51 formed with the V-groove 34, and the optical axis is refracted on that face to optically couple it to a surface incident light receiving device 36 directly mounted on the plane of substrate 51.

Figure 3:
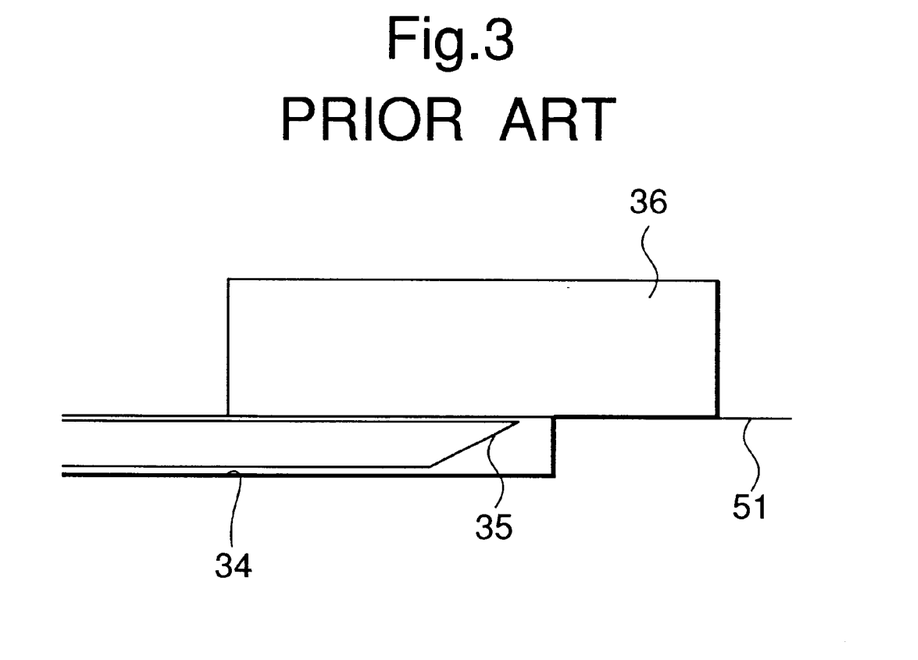
Figure 4:
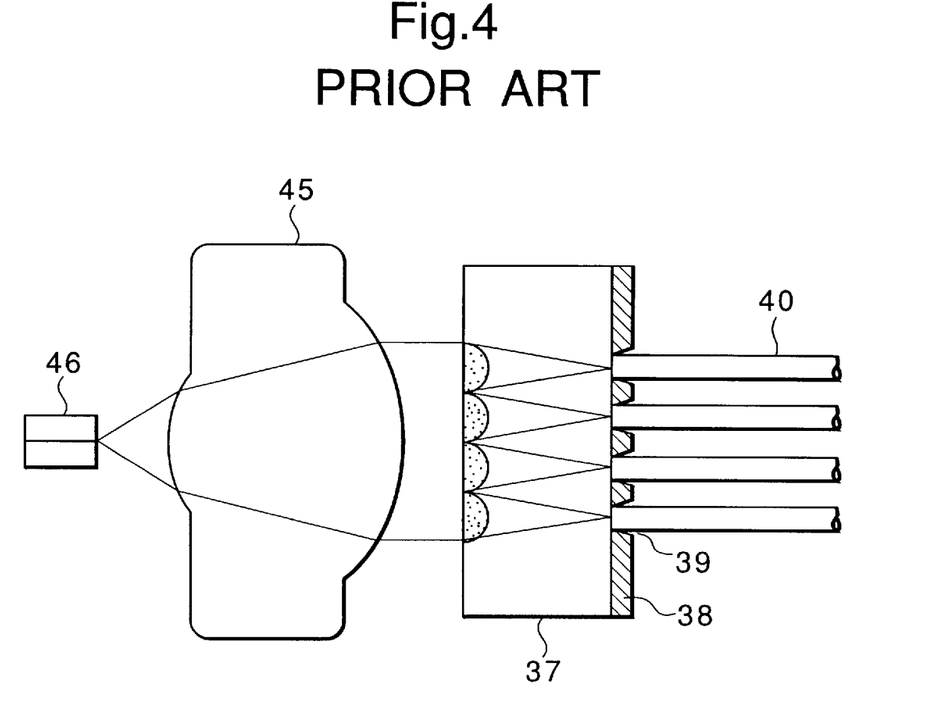

FIG. 3 shows a sectional view of the third prior art. In the figure, a silicon guide plate 38 is attached to a transparent substrate 37, and fiber optics 40 is inserted into a guide hole 39 for secure.

Here, reference numeral 45 denotes a lens, 46 a light emitting device.

These first through third prior arts have the problems discussed above.

Figure 5:
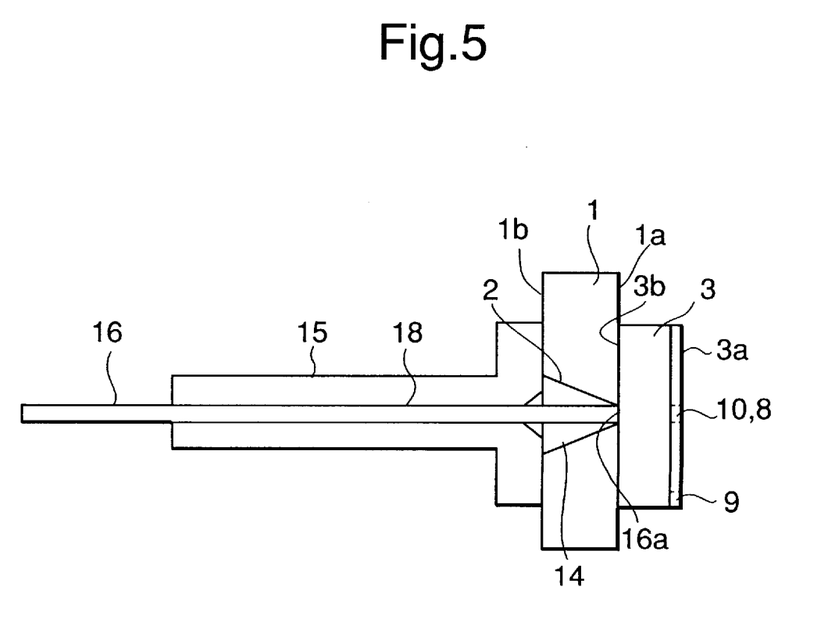
FIG. 5 is a sectional view of a best embodiment of securing structure of optical device and fiber optics according to the present invention.

FIG. 5 is a sectional view of a best embodiment of securing structure of optical device and fiber optics according to the present invention;

While this embodiment is described for a case where a light receiving device is used as the optical device, since the same is true for a case where a light emitting device is used, description is omitted for the latter case.

Referring to FIG. 5, the securing structure for optical device and fiber optics comprises a substrate 1, a light receiving device 3, a holder 15, an a fiber optics 16.

Then, the substrate 1 is held between the holder 15 and the light receiving device 3, and an end 16a of the fiber optics 16 contacts a side 3b of the light receiving device 3 through through holes (hereinafter called "guide holes") 18 and 2, which are formed in the holder 15 and the substrate 1, respectively.

The diameter of guide hole 2 formed in the substrate is formed to have a larger diameter at the contact surface 1b with the holder 15 than a diameter of the fiber optics 12, and to become smaller as it closes to the contact surface 1a with the light receiving device 3. Then, on the contact surface 1a with the light receiving device 3, the outer periphery of the fiber optics 16 contacts the inner surface of the guide hole 2.

The diameter of guide hole 2 formed in the substrate is formed to have a larger diameter at the contact surface 1b with the holder 15 than a diameter of the fiber optics 12, and to become smaller as it closes to the contact surface 1a with the light receiving device 3. Then, on the contact surface 1a with the light receiving device 3, the outer periphery of the fiber optics 16 contacts the inner surface of the guide hole 2.

Figure 6:
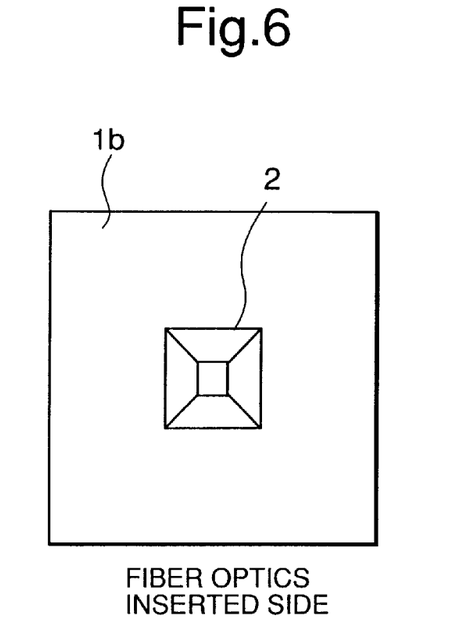
FIG. 6 is a plan view and a rear view of a board of the securing structure.
Figure 7:
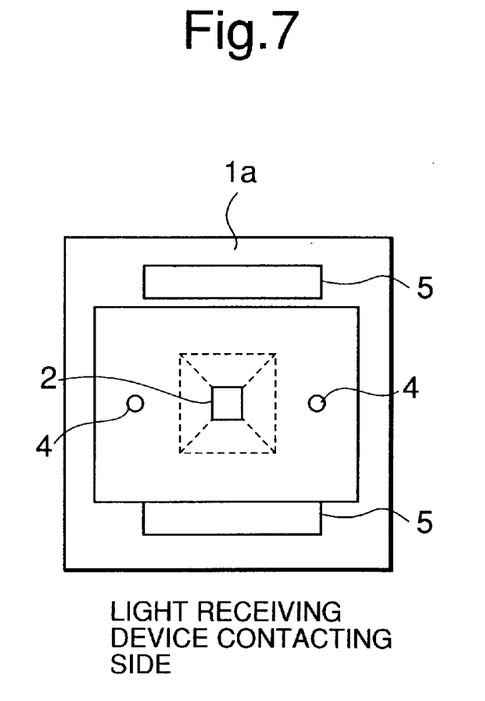
FIG. 7 is a plan view and a rear view of a board of the securing structure.

Now, the substrate 1 is described with reference to FIGS. 6 and 7.

An Si substrate with a thickness of 300 μm is used as the substrate 1. The guide hole 2 is formed by wet etching such that its opening in the surface 1a contacting the light receiving device 3 has a square with a side of 125 μm. On the contact surface 1a with the light receiving device, there are formed an alignment pattern (position pattern) 4 for mounting a visual alignment, and AuSn solder 5 for securing the light receiving device. The alignment pattern 4 is formed as a part of a metallized pattern, and symmetrically arranged around the guide hole 2.

Figure 8:
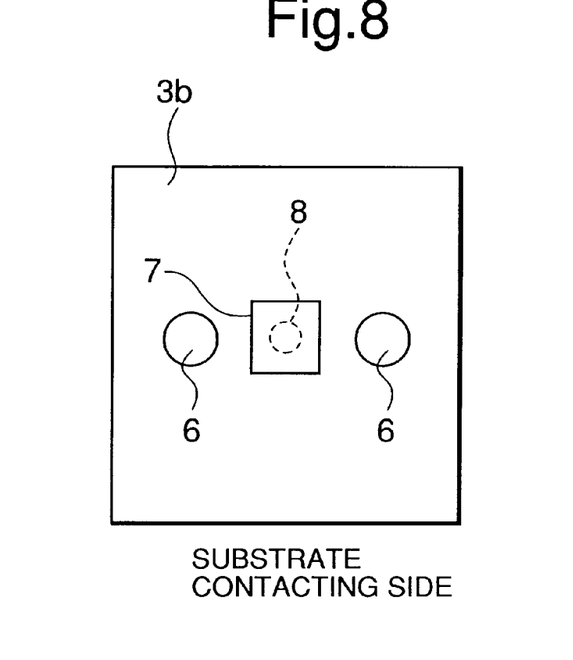
FIG. 8 is a plan view and a rear view of a light receiving device of the securing structure.
Figure 9:
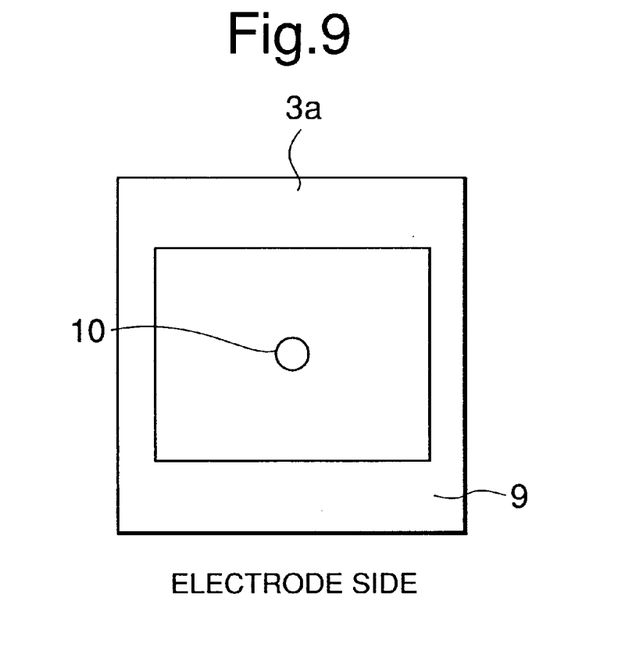
FIG. 9 is a plan view and a rear view of a light receiving device of the securing structure.
Figure 10:
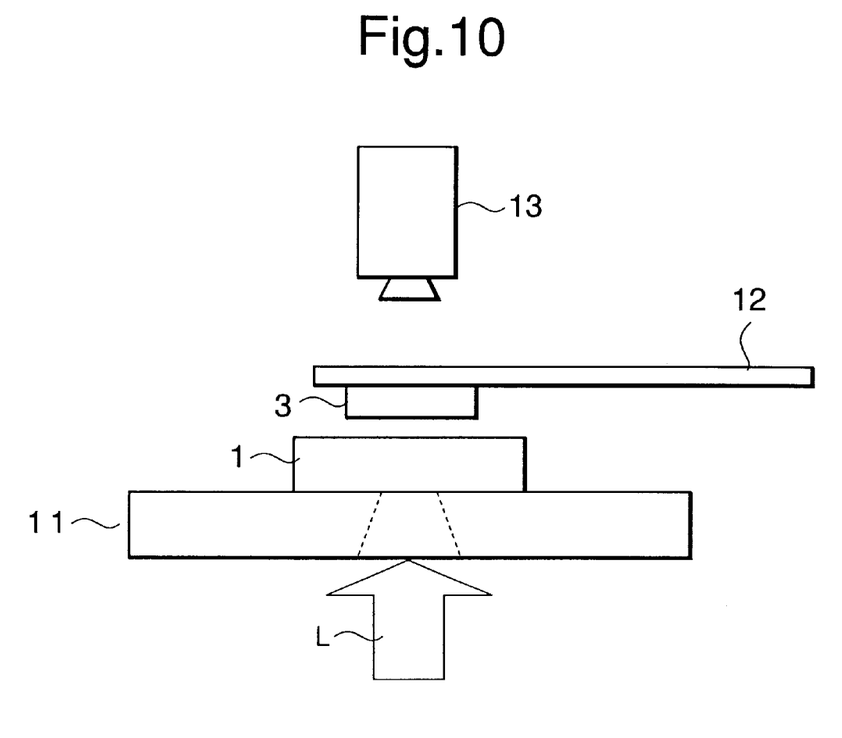
FIG. 10 is a schematic view for illustrating a method for securing a board 1 and a light receiving device 3 of the securing structure.

Now, the light receiving device 3 is described with reference to FIGS. 8 and 9.

The light receiving device is an APD (Avalanche Photo Diode) element using an InP substrate, with a substrate thickness of 200 μm and a light receiving diameter θ of 30 μm. Formed on the surface 3b contacting the substrate 1 are an alignment pattern 6 and a light incident window 7. The alignment pattern 6 is formed as a part of a metallized pattern, and symmetrically arranged around a light receiving surface 8. Spacing of the alignment pattern 6 is the same as that of the alignment pattern 4 on the substrate 1. On the opposite surface 32, there are formed a metallized pattern for a p-electrode 10 and an n-electrode 9 to be formed on the light receiving surface.

It should be noted that the thickness of the substrate 1, the length of opening of the guide hole 2, the thickness of substrate of the light receiving device 3, and the light receiving diameter are all mere examples, and not limited to such specific values.

Now, there is described a method for securing the substrate 1 and the light receiving device 3. FIG. 6 is a schematic view for illustrating a method for securing the substrate 1 and the light receiving device 3.

Image recognition and positioning are performed by stacking the light receiving device 3, which is held by an arm 12, on the substrate 1 mounted on a heater 11 which can project infrared light L from the bottom, and by projecting the infrared light, thereby imaging the alignment patterns 4 and 6 on the substrate 1 and the light receiving device 3 with a camera 13.

Here, at least the alignment pattern 4 is made of a material shutting off the infrared light L, and the alignment pattern 6 is made of a material transmitting the infrared light L.

Figure 11:
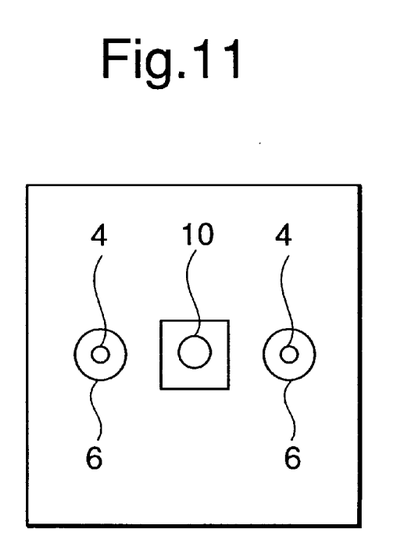
FIG. 11 is a monitor view when a board and a light receiving device of the securing structure are stacked.
Figure 12:
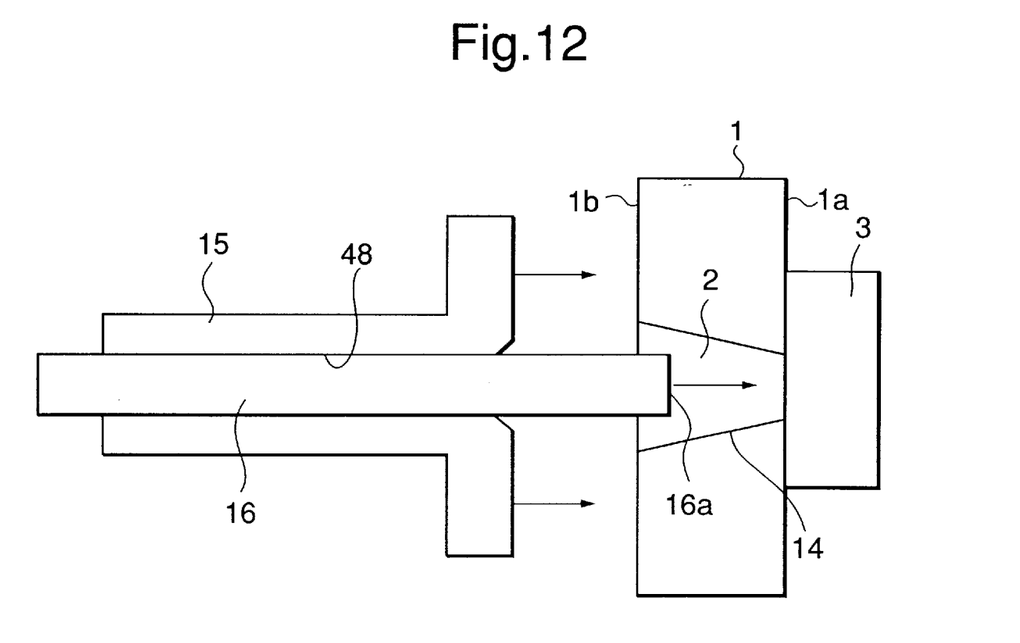
FIG. 12 is a schematic view for illustrating a method for securing a fiber optics of the securing structure.

FIG. 11 is a monitor view when the substrate 1 and the light receiving device 3 are stacked. The arm 12 is adjusted so that the alignment pattern 4 of the substrate 1 is positioned at the center of the alignment pattern 6 of the light receiving device 3. When the desired positional relationship is attained, the AuSn solder 5 on the substrate 1 is melted by heating the heater 11, thereby securing the substrate 1 and the light receiving device 3.

Now, there is described a method for securing the fiber optics 16. FIG. 8 is a schematic view for illustrating a method for securing a fiber optics 16.

First, the fiber optics 16 is inserted into the guide hole 48 in the holder 15, and the top end 16a of the fiber optics 16 is arranged to be projected from the holder 15. Here, the diameter of guide hole 48 is the same as that of the guide hole 2 in the surface 1a of the substrate 1 contacting the light receiving device.

First, optical adhesives 14 is filled in the guide hole 2, into which the top end 16a of the fiber optics 16 inserted into the holder 15 is inserted. Then, while the top end 16a of the fiber optics 16 is caused to contact the light receiving device 3, the holder 15 is slid toward the substrate 1, caused to contact the substrate 1, and secured therewith.

In the securing structure shown in FIG. 5, the positional relationship between the fiber optics 16 and the light receiving surface 8 is determined by a securing accuracy of the substrate 1 and the light receiving device 3, and an accuracy in forming the guide hole 2. The securing accuracy of the substrate 1 and the light receiving device 3 is in a range of error of the visual alignment mounting system, in which a mounting accuracy well in sub-micrometer range has been provided. In addition, an accuracy well in sub-micrometer range can be attained for formation of the guide hole 2 with etching by managing temperature and concentration of etchant, and controlling etching time.

Therefore, since the positional relationship can be determined in the sub-micrometer range between the fiber optics 16 and the light receiving surface 8, a high coupling efficiency can be easily attained.

In the structure according to the present invention, since the light receiving device 3 is secured on the fiber optics 16 by directly contacting them, the optical length between the top end 16a of the fiber optics 16 and the light receiving surface 8 is very short because it depends on the substrate thickness of the light receiving device 3, so that spreading of light can be suppressed to low on the light receiving surface 8.

When the fiber optics 16 and the light receiving device 3 are secured in the structure shown in FIG. 5, and its optical coupling characteristics are evaluated, it reveals that it is lower only by about 2% in the quantum efficiency when compared with the case where the fiber optics 16 is adjusted to the optimum position, so that mounting can be performed at a high accuracy without adjustment.

Figure 13:
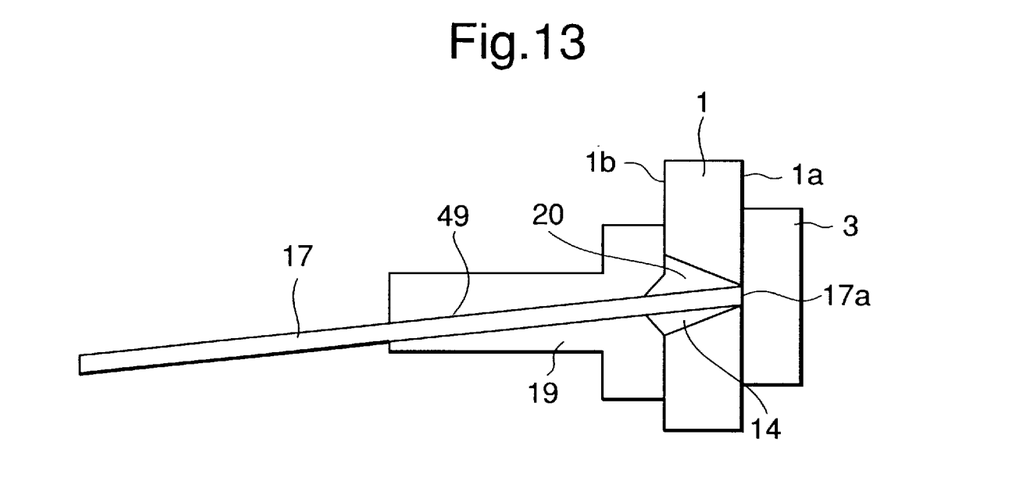
FIG. 13 is a sectional view of a second embodiment of the securing structure of optical device and fiber optics according to the present invention.

Then, there is described as a second embodiment of the present invention a case where a fiber optics of which the end face is cut askew to reduce internal light reflection is used. FIG. 13 is a sectional view of the second embodiment of securing structure of optical device and fiber optics.

In the figure, the fiber optics 17 differs from the fiber optics 16 in that its end 17a is cut askew, a holder 19 differs from the holder 15 in that a guide hole 49 is inclined with respect to a surface 1a of substrate 1 contacting the optical device, and a guide hole 20 differs from the guide hole 2 in that its shape is deformed so that the fiber optics 17 can be inserted with inclination. All other features are the same.

In this case, the cut surface 17a of the fiber optics 17 contacts the light receiving device 3. In addition, on the surface 1a contacting the light receiving device 3, the outer periphery of the fiber optics 17 contact the inner surface of the guide hole 20.

Figure 14:
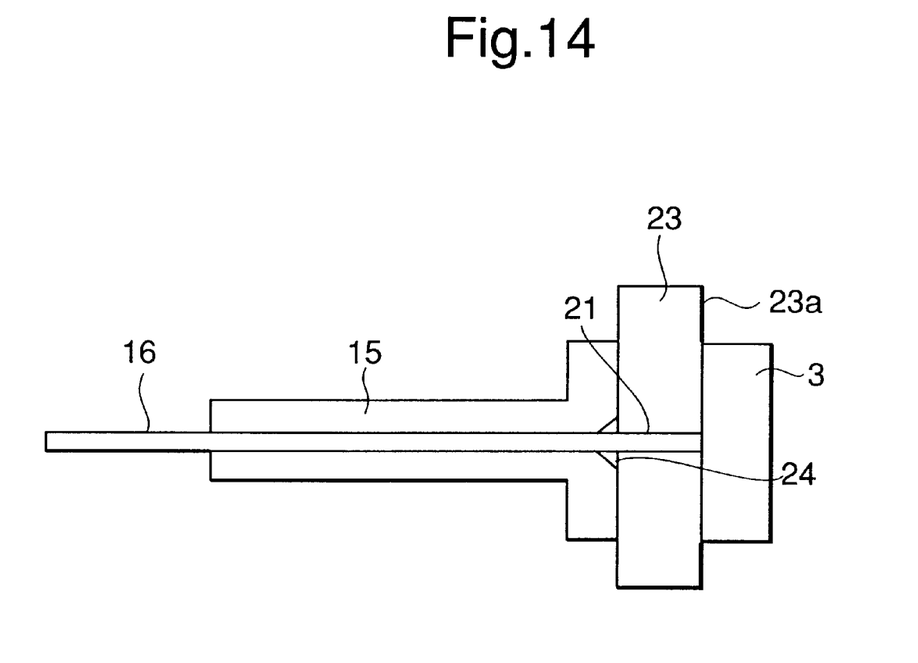
FIG. 14 is a sectional view of a third embodiment of the securing structure of optical device and fiber optics according to the present invention.

Then, there is described as a third embodiment of the present invention a case where a guide hole is formed in a cylindrical shape. FIG. 14 is a sectional view of the third embodiment of securing structure of optical device and fiber optics.

In the figure, a guide hole 21 differs from the guide hole 2 in that its inner surface is formed in a cylindrical shape so that its inner surface can entirely contact the outer periphery of the fiber optics 16. All other features are the same. Therefore, the reference numeral for the substrate is also changed to 23.

The guide hole 21 in the substrate 23 is formed into a cylindrical shape by dry etching or the like.

The guide hole 21 may have any shape as long as its opening in the surface 23a contacting the light receiving device 3 has a shape to uniquely position the fiber optics 16. In addition, the substrate 23 may be any material such as an Si substrate or glass substrate through which the infrared light can transmit. The adhesives 24 may be any materials such as an epoxy type optical adhesives or Si type gel which cause no trouble optical coupling when it is placed in the optical path.

The structure shown in the figure also provides a high coupling efficiency as in the structure of FIG. 5, so that mounting can be attained at a high accuracy without adjustment.

Figure 15:
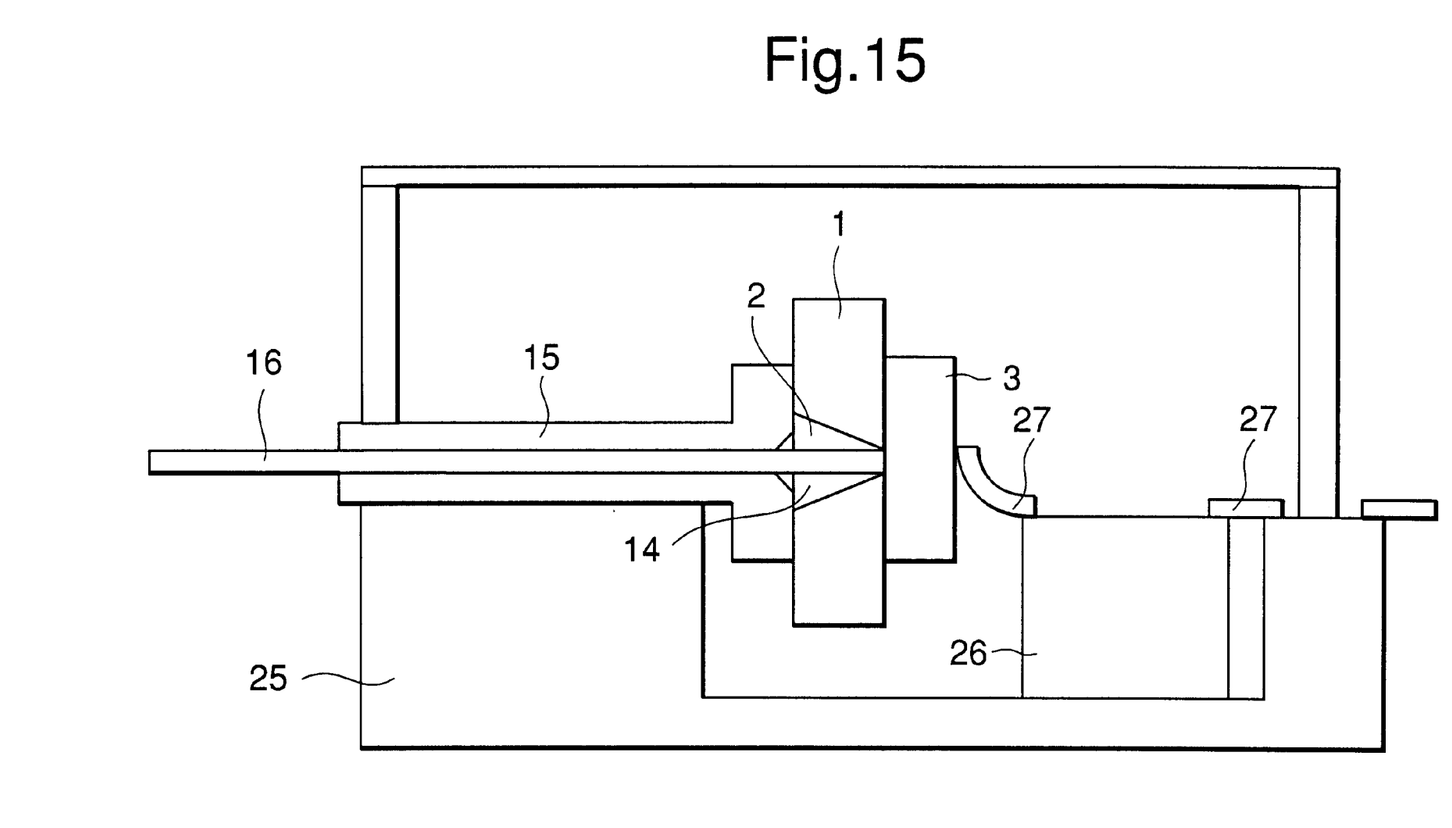
FIG. 15 is a sectional view of a fourth embodiment of the securing structure of optical device and fiber optics according to the present invention.

As a fourth embodiment, a case is described in which a light receiving module containing a preamplifier therein is constituted by using the securing structure. FIG. 15 is a sectional view of the fourth embodiment of securing structure of optical device and fiber optics.

In the figure, the light receiving module comprises the substrate 1, the light receiving device 3, the holder 15, a fiber optics 16, a package 25, a preamplifier 26, and a film 27.

A part of the holder 15 is secured on the package 25. The film 27 is employed for an electric contact between the light receiving device 3 and the preamplifier 26, on which film a micro-strip lines accommodating a high frequency region can be formed.

What is claimed is:

1. A securing structure for optical device and fiber optics comprising a substrate having a through hole through which said fiber optics is inserted, and said optical device secured on the plane of substrate at which the through hole opens, wherein said substrate has a first position pattern provided in relation to the location of said through hole on the plane of board at which the through hole opens, said optical device having a second position pattern provided in relation to the location of a light receiving or emitting section, fiber optics inserted into said substrate being optically coupled to said optical device from the positional relationship between said first and second position patterns.

2. A securing structure for optical device and fiber optics as set forth in claim 1, wherein said first position pattern is a pair of patterns provided at each side of said through hole, said second position pattern being another pair of patterns at each side of said light receiving or emitting section with the same spacing as said pair of patterns, fiber optics inserted into said substrate being optically coupled to said optical device by aligning the laterally corresponding pattern positions of said first and second position patterns.

3. A securing structure for optical device and fiber optics as set forth in claim 2, wherein said first position pattern is made of a material shutting off light, and said position pattern is made of a material transmitting light, whereby said first and second patterns are matched by recognizing said first position pattern through said second position pattern.

4. A securing structure for optical device and fiber optics as set forth in claim 3, wherein said light is infrared light.

5. A securing structure for optical device and fiber optics as set forth in any one of claims 1 through 4, wherein the diameter of through hole formed in said substrate is formed to become smaller as it closes to the surface of the opening of through hole in which said optical device is secured.

6. A securing structure for optical device and fiber optics as set forth in any one of claims 1 through 5, wherein the diameter of through hole formed in said substrate is formed with inclination relative to the surface of the opening of through hole in which said optical device is secured.

7. A securing structure for optical device and fiber optics as set forth in any one of claims 1 through 4, wherein the diameter of through hole formed in said substrate is formed to have a constant diameter.

* * * * *